(12) United States Patent
Kwasny et al.

(10) Patent No.: US 7,492,385 B2
(45) Date of Patent: Feb. 17, 2009

(54) LABELING AN OPTICAL MEDIUM HAVING A PRELABELED OR UNLABELABLE REGION

(75) Inventors: David M Kwasny, Corvallis, OR (US); Gregory J. Lipinski, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 329 days.

(21) Appl. No.: 11/357,762

(22) Filed: Feb. 16, 2006

(65) Prior Publication Data

US 2007/0188587 A1 Aug. 16, 2007

(51) Int. Cl.
*B41J 2/435* (2006.01)
(52) U.S. Cl. .................................................. 347/224
(58) Field of Classification Search ................ 347/224, 347/225
See application file for complete search history.

(56) References Cited

U.S. PATENT DOCUMENTS

| | | | |
|---|---|---|---|
| 4,751,394 A | 6/1988 | Matsuoka | |
| 5,967,676 A * | 10/1999 | Cutler et al. | 400/70 |
| 6,369,844 B1 * | 4/2002 | Neumann et al. | 347/224 |
| 6,866,354 B2 | 3/2005 | McClellan | |
| 2001/0026531 A1 | 10/2001 | Onodera et al. | |
| 2003/0179674 A1 | 9/2003 | Anderson | |
| 2003/0185144 A1 | 10/2003 | Anderson et al. | |
| 2004/0212670 A1 * | 10/2004 | McClellan et al. | 347/224 |
| 2005/0179766 A1 | 8/2005 | Onodera et al. | |
| 2005/0276189 A1 | 12/2005 | Koll | |

FOREIGN PATENT DOCUMENTS

| | | |
|---|---|---|
| EP | 1385154 A | 1/2004 |
| JP | 08-327339 | 12/1996 |
| JP | 2004192735 A * | 7/2004 |

OTHER PUBLICATIONS

Annex to Partial International Search; Application No. PCT/US2007/003927; filed Feb. 15, 2007; report issued Jul. 19, 2007.

* cited by examiner

*Primary Examiner*—Hai C Pham

(57) ABSTRACT

A method for locating a labelable region on a surface of an optical storage medium including an unlabelable region. A laser beam is impinged onto a location on the surface without marking the location. Laser energy reflected from the location is detected. Based on the reflected laser energy, it is determined whether the location is in a labelable region markable by the laser energy or an unlabelable region not markable by the laser energy.

15 Claims, 8 Drawing Sheets

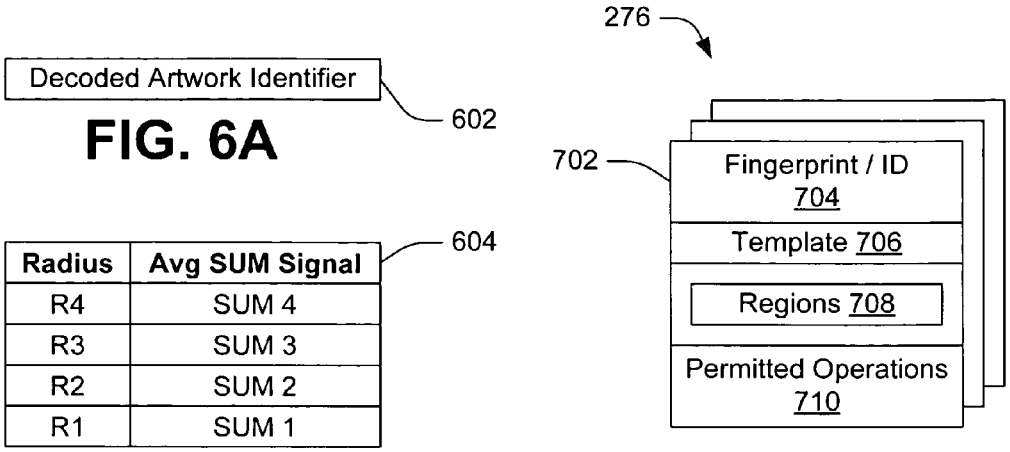
FIG. 6A
FIG. 6B
FIG. 7
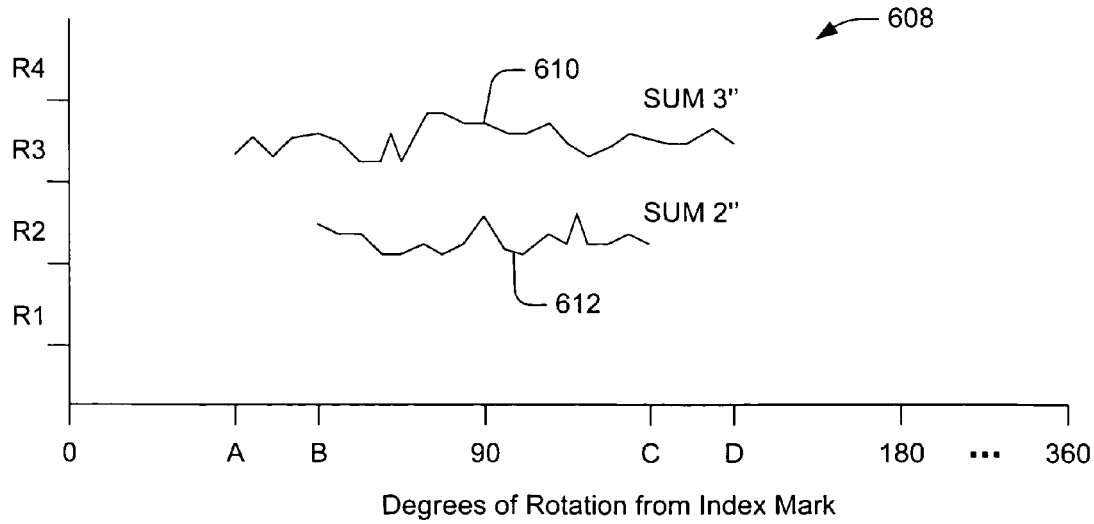
FIG. 6C
FIG. 6D

LABELING AN OPTICAL MEDIUM HAVING A PRELABELED OR UNLABELABLE REGION

BACKGROUND OF THE INVENTION

In the recent past, media that can be optically marked with a visible image or label have become available. For optical discs on which a user may store his own data (such as, for example, CD-R/RWs and DVD+/-R/RWs), the laser in an optical drive that writes the data may also be used to perform the labeling operations. In some cases, these optical discs are coated or fabricated with a layer of laser-imageable material. With regard to labeling, a computer application program typically displays an image of the optical disc, and allows a user to specify the text, graphics, and images that will be optically marked on the disc. In this manner the user can preview the results before the labeling operation is performed. However, it can be desirable in many applications to use optical discs having artwork that is preformed on the optical disc. For example, such artwork may be descriptive of the company that is producing the discs and the artwork may be, for instance, the company logo. Or, the artwork may be descriptive of the data contents of the disc, such as a depiction of a record label on a CD on which music files are to be stored.

Such artwork is typically silk-screened or ink-printed on the surface of the optical disc. As a result, the regions of the disc that are occupied by the artwork do not contain laser-imageable material or the laser-imageable material is covered by the artwork, and thus these regions are not optically labelable. It is desirable that the computer application program used to specify the label data indicate to the user those regions that are not optically labelable, so that the user can avoid placing any label data in those regions. It is further desirable that an image of the preformed artwork be displayed along with the user-defined label data, so that that the user may see the most accurate preview possible of the actual labeling results. However, in many cases this is not now possible. For these and other reasons, there is a need for the present invention.

BRIEF DESCRIPTION OF THE DRAWINGS

The features of the present invention and the manner of attaining them, and the invention itself, will be best understood by reference to the following detailed description of embodiments of the invention, taken in conjunction with the accompanying drawings, wherein:

FIGS. 6A-6D are exemplary schematic representations of alternative artwork parameters determined by an optical disc drive, and communicated to a host, of the media system of FIG. 2, in accordance with an embodiment of the present invention;

FIG. 7 is a schematic representation of a prelabeled artwork library of the media system of FIG. 2 usable with the artwork parameters of FIGS. 6A-6D to identify prelabeled artwork in the unlabelable regions of the optical medium of FIG. 1;

DESCRIPTION OF THE PREFERRED EMBODIMENTS

Figure 1:
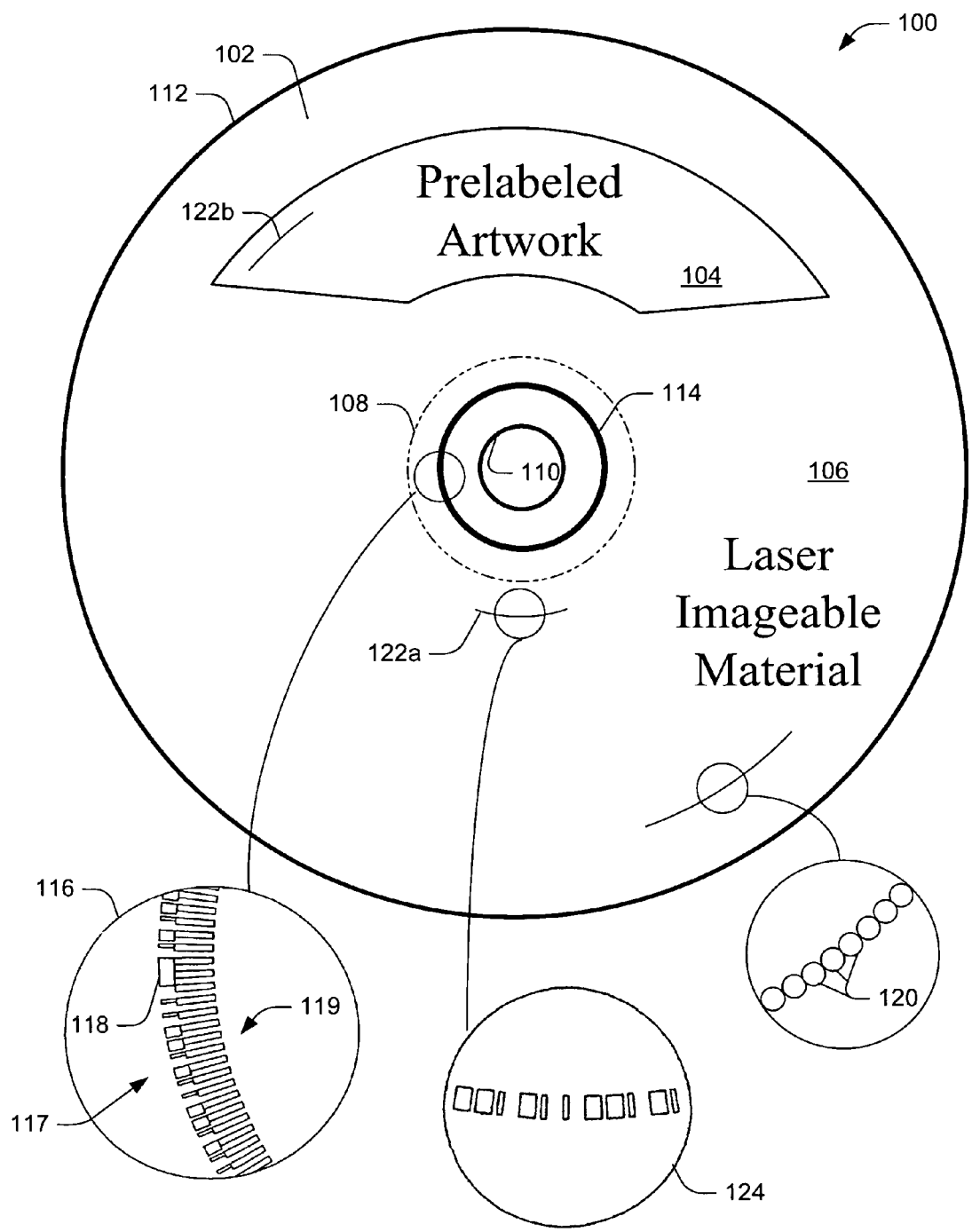
FIG. 1 is a schematic representation of an exemplary optical storage medium having labelable and unlabelable regions in accordance with an embodiment of the present invention.

Referring now to the drawings, there is illustrated an embodiment of an optical media labeling system constructed in accordance with the present invention which distinguishes regions of an optical medium that are labelable by application of laser energy from those that are unlabelable in this manner. In embodiments where the unlabelable regions contained prelabeled artwork, the system may further identify the prelabeled artwork. By determining and identifying these regions, the system can present to a user a visual representation of the optical medium so that the user can appropriately locate and form desired labeling data such as text, graphics, or images in the labelable regions.

In one embodiment, an optical disc drive includes at least one laser that emits a beam of laser energy onto a plurality of locations on the surface of an optical disc inserted in the drive, but without forming any optically visible marks on the surface. A sensor detects laser energy that is reflected from the locations and, based on the reflected energy, determines the labelable and unlabelable regions. In some embodiments, the prelabeled artwork present in the unlabelable regions can be identified based on the boundaries of the regions, the characteristics of the reflected laser energy that are detected by the sensor, or both. An application program can then display a visual representation of the optical disc that distinguishes the labelable and unlabelable regions, and illustrates the prelabeled artwork. The user interacts with the program to provide at least one of text, graphics, or image data, and to locate this data as desired in the labelable regions. When the user is satisfied with the content and layout of the labeling data, the laser is operated in such a manner so as to form optically visible marks corresponding to the labeling data on the various locations of the labelable regions of the optical disc surface.

As can be understood with reference to FIG. 1, a surface 102 of an exemplary optical disc 100 may include at least one unlabelable region 104 that cannot be optically marked or labeled by the application of laser energy to the region 104. The unlabelable region 104 may include prelabeled artwork in all or part of the region 104. The unlabelable region 104 may be formed of, or coated with, materials of a variety of colors. Prelabeled artwork in the unlabelable region 104 may be ink-printed, or fabricated with silk-screening of a plurality of layers, again in a variety of colors. The number and height of the various layers in particular locations may provide the unlabelable region 104 with a surface texture. The number, size, shape, and location of unlabelable regions 104 on the disc 100 may vary.

The disc 100 may further include at least one labelable region 106 that is fabricated from or coated with laser-imageable material that can be optically marked or labeled by the application of laser energy of a predefined wavelength, intensity, and duration to the region 106. When inserted in an optical disc drive, one or more lasers can impinge a laser-accessible region of the surface 102 of the disc 100 that extends from an inner annulus 108 outward from the hub 110 to the edge of the disc 112, or alternatively to an outer annulus (not shown). The number, size, shape, and location of labelable regions 106 on the disc 100 may vary.

In one embodiment, a labelable region 106 of the optical disc 100 is chemically treated so as to change an optical property such as darkness, reflectivity, or color upon being irradiated with a beam from one or more of the lasers of laser energy of a corresponding one or more particular predetermined wavelengths. Such chemical treatment may include, for example, a coating of thermo-chromic material that has been screen-printed on the surface of the labelable region such that this material changes from a light to a dark color when activated by the beam of one of the lasers. The thermo-chromic material may comprise, for example, a mixture of color-forming dye, activator, and antenna contained in a polymer matrix. The antenna absorbs the laser energy of the predetermined wavelength and converts it to heat. Upon irradiation with the laser energy of the predetermined wavelength of a sufficient intensity and for a sufficient period of time, the heat causes the activator, dye, and the polymer matrix to melt, thereby allowing the activator to interact with the dye. The interaction results in a chemical change to the dye that causes a change in color. The label material may vary slightly from manufacturer to manufacturer, or from one disc to another disc, or even from one region on a disc to another region on the same disc. As a consequence, the appearance of the generated label may vary accordingly. It should be noted that the antenna substantially absorbs laser energy only of the predetermined wavelength, not of other wavelengths. As a result, the laser-imageable material is relatively absorptive of laser energy of the predetermined wavelength, but relatively reflective of laser energy of other than the predetermined wavelength, particularly laser energy at wavelengths corresponding to visible light.

In one embodiment, the optical disc 100 further includes a media control ring 114 that can indicate timing information and orientation information 116. The ring 114 may be located closer to the hub 110 than the inner annulus 108. The contents of the ring 114 may be formed of alternately more reflective and less reflective regions, and may be embossed, molded, silk-screened, printed, or otherwise formed on the disc 100. The pattern of the more and less reflective regions may be read by a positional sensor or optical encoder that is positionable adjacent the ring 114 and used to determine the angular orientation and the speed of rotation of the disc 100. An index mark 118 indicates a known position of the disc 100, which may be denoted as an angular position of 0 degrees. In one embodiment, the index mark 118 is a single mark of a unique angular displacement. In one embodiment, spokes 119 disposed at regular intervals around the ring 114 may be read and counted to indicate angular displacement from the 0 degree position. In another embodiment, a pattern 117 of irregularly sized more reflective and less reflective regions may be used to determine angular displacement from the 0 degree position. The pattern 117 may also encode a limited amount of information that is indicative of characteristics of the disk. In one embodiment, this may include an indication as to whether the disc surface contains any unlabelable regions, or whether the entire disc surface forms a labelable region.

Various positions in the laser-accessible region of the surface, such as one or more locations 120, may be labeled or marked by the application of laser energy of a predefined wavelength, of an intensity and for a duration sufficient to change an optical property of the location 120 perceptible by a human observer. The optical property may include a color of the location 120 or a darkness of the location 120.

In some embodiments the disc 100 may include encoded data 122a-b, such as, for example, an exemplary bar code 124, that is indicative of the predefined artwork in the unlabelable region or regions 104. The encoded data typically occupies only a small area of the disc surface, and thus appears unobtrusive to a human observer. While exemplary bar code 124 is illustrated as one-dimensional, it is understood that a bar code 124 may also be two-dimensional, spiral, or in other forms.

In one embodiment, encoded data 122a may be located at a predefined position on the optical disc 100, such as at a particular radial distance from the inner annulus 108 or hub 110, and in some embodiments at a particular angular position. Using a predefined location for the encoded data 122a may simplify its detection.

In another embodiment, encoded data 122b may be located at a relative position within an unlabelable region 104. The encoded data 122b may be at a predefined relative position, such as a particular radial and angular position with respect to an origin of the unlabelable region 104, or at a variable position within the unlabelable region 104. Using a predefined position for the encoded data 122b relative to the origin may simplify its detection as compared to a variable position.

Because the encoded data 122a-b is located within the laser-accessible region, it is not read by the encoder used for the media control ring 114, but rather is read by impinging a beam of laser energy onto the encoded data 122a-b and detecting with a sensor the laser energy that is reflected from the locations that constitute the encoded data 122a-b. The differences in the reflected energy from the various locations of encoded data 122a-b allow the encoded data to be ascertained by the optical drive and subsequently used to identify the artwork, as will be discussed subsequently with reference to FIGS. 7 and 9.

Figure 2:
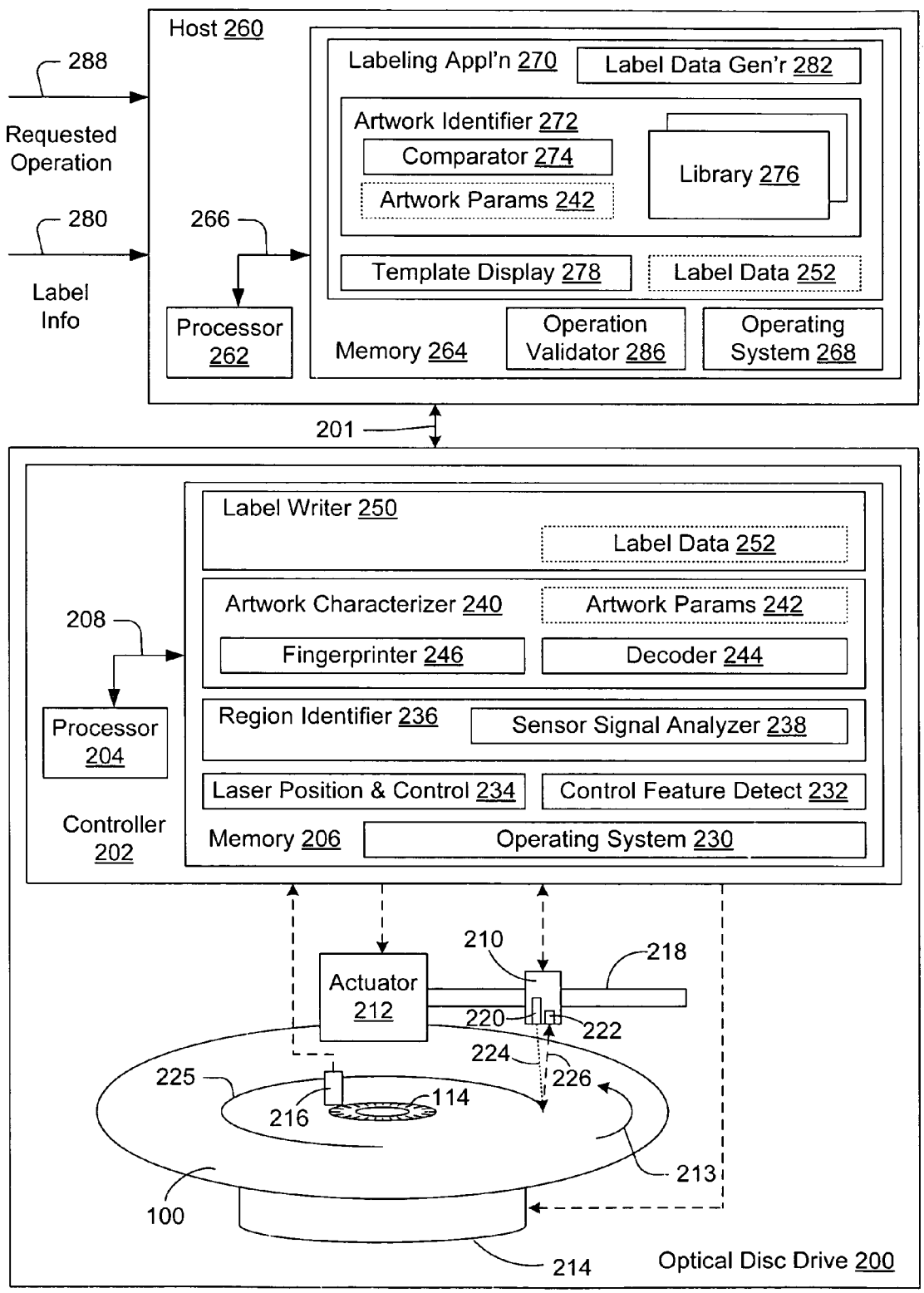
FIG. 2 is a schematic representation of an optical media system for identifying the labelable and unlabelable regions of the optical storage medium of FIG. 1, and for labeling the labelable regions with information provided by a user, in accordance with an embodiment of the present invention.

As can be understood with reference to FIG. 2, one embodiment of an optical media system usable with the optical disc 100 includes an optical disc drive 200 communicatively coupled to a host 260 via communications link 201. Link 201 may be a direct or networked connection over a variety of media, as can be appreciated by those with ordinary skill in the art. The host 260 may be, for example, a computer system, server, or other similar device. In one embodiment, the optical disc drive 200 includes a controller 202. The controller includes a processor 204 and a memory 206, both of which are coupled via a local interface 208. In this respect, the local interface 208 may be, for example, a data bus with an accompanying control/address bus as can be appreciated by those with ordinary skill in the art. The optical disc drive 200 further includes an optical pickup unit 210, an actuator 212, a spindle 214, and a positional sensor 216. In one embodiment, the positional sensor 216 is an optical encoder. When in use, an optical disc 100 is placed on the spindle 214 as shown. The optical pickup unit 210, actuator 212, spindle 214, and positional sensor 216 are all operatively or electrically coupled to the controller 202. In particular, these components are coupled to the controller 202 by way of an electrical connection through which electrical signals may be received from or transmitted by the controller 202 in orchestrating the operation of the optical disc drive 200 as will be described. In one implementation, the optical pickup unit 210, actuator 212, spindle 214, and the positional sensor 216 are coupled to the local interface 208 through appropriate interface circuitry (not shown) as can be appreciated.

The actuator 212 may comprise, for example, a stepper motor or other such device. The actuator is operatively coupled to the optical pickup unit 210, for example, using a screw shaft 218. In this respect, the actuator 212 may be manipulated by the controller 202 in order to move the optical pickup unit 210 back and forth along the length of the screw shaft 218 during the normal operation of the optical disc drive 200 to change the radial position of the optical pickup unit 210 with respect to the disc 100 as will be described. In this respect, the actuator 212 positions the optical pickup unit 210 in the radial direction relative to the optical disc 100 during the normal course of operation of the optical disc drive 200. In embodiments where the actuator 212 and screw shaft 218 provide only a coarse radial positioning, an additional mechanism (not shown) in the optical pickup unit 210 may provide fine radial positioning.

The optical pickup unit 210 includes a laser 220 and a sensor 222 that may be employed to read data from the optical disc 100. In this respect, the laser 220 is controlled to generate a laser beam 224 that is directed to the optical disc 100. The laser 220 may emit laser energy of one or more wavelengths as can be appreciated by those with ordinary skill in the art. At least a portion of the laser beam 224 may reflect off locations of the optical disc 100, such as locations along path 225, as reflected laser energy 226. One or more optical components such as a lens (not shown) may be employed in the optical pickup unit 210 to focus the laser beam 224 generated by the laser 220 or to focus the reflected laser energy 226 as can be appreciated. In some embodiments, laser 220 may include a plurality of lasers, each capable of emitting laser energy of one or more wavelengths.

The sensor 222 detects reflected laser energy 226 and generates an electrical signal that is applied to the controller 202. The electrical signal may be a voltage signal or a current signal. The magnitude of the electrical signal generated by the sensor 222 is generally proportional to the magnitude of the reflected laser energy 226 that is incident upon the sensing surface area of the sensor 222. The sensor 222 may be a single sensor or multiple sensors operating cooperatively. Where multiple sensors are employed as the sensor 222, the voltage signal may be a sum of all of the voltage signals from each of the multiple sensors. Such a signal may be referred to as a "sum signal". In one embodiment the sensor 222 is a wideband sensor that can effectively detect reflected laser energy 226 of a wide variety of wavelengths.

The optical pickup unit 210 may be manipulated to write labeling data to the optical disc 100 by controlling the laser 220 in the optical pickup unit 210 so as to form optically visible markings in a desired pattern in or on the laser-imageable labelable regions 106 of the optical disc 100.

The spindle 214 includes a motor or other such device that spins the optical disc 100. This motor may be, for example, a stepper motor or other type of motor. In this respect, the optical disc 100 is placed in a seating position relative to the spindle 214. Thereafter, the optical disc 100 may be spun relative to the optical pickup unit 210 and the positional sensor 216. In some embodiments, a clamping mechanism (not shown) holds the disc 100 to the spindle 214 to ensure that the disc 100 does not slip. The positional sensor 216 obtains positional data from the timing and orientation information 116 of the media control ring 114 of the optical disc 100 as it rotates on the spindle 214. By virtue of the positional data obtained, the precise location of the optical pickup unit 210 (and thus the laser 220 and sensor 222) relative to the optical disc 100 can be tracked during operation.

An embodiment of the controller 202 of optical disc drive 200 further includes a number of modules stored in the memory 206 and executable by the processor 204 in order to control the operation of the optical disc drive 200, including the detection of labelable, unlabelable, and prelabeled artwork regions, and the labeling of labelable regions. One such module is an operating system 230, which is executed to control the allocation and usage of hardware resources such as the memory, processing time and peripheral devices in the optical disc drive 200. In this manner, the operating system 230 serves as the foundation on which other modules depend, as is generally known by those with ordinary skill in the art.

Another module is a control feature detection module 232, which is configured to read the timing and orientation information 116 of the media control ring 114 with the positional sensor (optical encoder) 216. The positional sensor 216 senses the passing of the spokes 119 disposed on the optical disc 100. Each time a spoke 119 passes the positional sensor 216, the positional sensor 216 generates a pulse that is received by the controller 202. Each pulse may be considered as a signal that informs the controller 202 of an incremental rotation of the optical disc 100. To track the actual location of the optical disc 100 based upon the pulses, the controller 202 may include a counter that counts the pulses up to a total number of pulses in a single rotation to determine the actual angular position of the disc 100 at a given time. The control feature detection module may be further configured to read other data encoded in the ring 114 that is indicative of characteristics of the disk, including an indication as to whether the disc surface contains any unlabelable regions, or any regions that contain prelabeled artwork.

Yet another module is a laser position and control module 234, which is configured to move the optical pickup unit 210 using actuator 212 to a desired radial position, and to rotate the disc 100 in direction 213 via the spindle 214 into a desired angular position with respect to index mark 118. It controls the movement of the optical pickup unit 210 by manipulating the actuator 212 to cause the optical pickup unit 210 to move along the screw shaft 218 as needed. In addition, the laser position and control module 234 controls the rotation of the optical disc 100 by controlling the speed of the spindle 214. This module 234 further turns the beam from laser 220 on and off. In some embodiments it may set a desired intensity of the laser beam, and in some embodiments it may select a wavelength for the energy of the emitted laser beam. It also senses the reflected laser light 226 with the sensor 222, and a corresponding signal is generated that is applied to the controller 202 through an appropriate interface circuit.

An embodiment of the controller 202 may further include a region identifier module 236 that is configured to identify the boundaries and the characteristics of the labelable regions 106 and the unlabelable regions 104. The region identifier module 236 causes the laser position and control module 234 to impinge a laser beam onto locations 120 on the surface along path 225 without marking the location, and detect the laser energy reflected from the locations 120. The region identifier module 236 includes a sensor signal analyzer module 238 that analyzes the reflected laser energy in order to determine whether surface locations are in a labelable region 106 markable by the energy from the laser beam, or in an unlabelable region 104 not markable by the energy from the laser beam. In some embodiments, the analyzing may include normalizing, averaging, and/or quantizing the sum signal produced in response to the reflected laser energy by the sensor 222. The region identifier module 236, using position information of the locations 120, also maps the boundaries of the labelable 106 and unlabelable 104 regions.

An embodiment of the controller 202 may also include an artwork characterizer module 240 which is configured to form one or more artwork parameters 242 that are indicative of each of the unlabelable regions 104 on the disc 100. The artwork parameters 242 may be provided to the host 260 to allow the host 260 to identify the prelabeled artwork in the corresponding unlabelable region 104. The artwork parameters 242 are derived from the reflected laser energy detected by the sensor 222. In one embodiment, an artwork parameter may correspond to the encoded data 122a-b following decoding performed by decoder module 244. In another embodiment, one or more artwork parameters may correspond to a fingerprint generated by a fingerprinter module 246, as will be discussed subsequently in greater detail with reference to FIGS. 6A-6D.

An embodiment of the controller 202 may additionally include a label writer module 250, which is configured to mark the labelable regions 106 with label data 252 received from host 260. Label writer module 250 interacts with laser position and control module 234 to cause the laser 220 to form the pattern of marks on corresponding locations 120 of disc 100 to produce the desired optically visible label in the labelable regions 106. The label data 252 may be embodied in the form of radial data that forms a number of concentric and adjacent circular tracks on the disc 100, or that forms a spiral track on the disc 100. When writing the label to the optical disc 100, the label data 252 is received from the host 260 and temporarily stored in the memory 206. In some embodiments, the memory 206 may not be large enough to accommodate all of the label data to be written to the surface of the optical disc 100. Consequently, the host 260 may transmit the label data 252 to the optical disc drive 200 in increments, and at a rate which maintains a minimum amount of the label data 252 in the memory 206 at all times during a labeling operation so that labeling can be performed in an efficient manner.

In some embodiments, memory 206 of controller 202 may contain additional modules not shown in FIG. 2; for example, modules that are configured to read binary data from, and write binary data to, binary data regions and structures of the optical disc, as can be appreciated by those of ordinary skill in the art.

In one embodiment, the host 260 includes a processor 262 and a memory 264, both of which are coupled via a local interface 266. In this respect, the local interface 266 may be, for example, a data bus with an accompanying control/address bus as can be appreciated by those with ordinary skill in the art. The host 260 further includes a number of modules stored in the memory 264 and executable by the processor 262 in order to identify prelabeled artwork in the unlabelable regions 104, present a template to a user indicative of the labelable and unlabelable regions and the prelabeled artwork, receive labeling data for the labelable regions 106 from the user, and send the labeling data to the optical drive 200 to be formed in the labelable regions 106. In some embodiments, the host 260 may also validate an operation requested by the user based on the prelabeled artwork.

One such module is an operating system 268, which is executed to control the allocation and usage of hardware resources such as the memory, processing time and peripheral devices of the host 260. In this manner, the operating system 268 serves as the foundation on which other modules in the host 260 depend, as is generally known by those with ordinary skill in the art.

An embodiment of the host 260 may include a labeling application program 270. The labeling program 270 includes an artwork identifier module 272, which receives the artwork parameters 242 from the optical drive 200. As will be subsequently discussed in greater detail with reference to FIG. 7, a comparator module 274 compares at least some of the artwork parameters 242 with individual entries in a prelabeled artwork library 276 in order to identify the artwork that is present in the unlabelable regions 104, and obtain a corresponding prestored template that illustrates the prelabeled artwork. If the prelabeled artwork cannot be identified, a template may be generated that illustrates the boundaries of the unlabelable regions 104, if the boundaries were provided to the host 260 by optical drive 200. A template display module 278 subsequently displays the template on a monitor (not shown) that is coupled to the host 260. As displayed, the template typically includes an outline of the disc 100 along with the boundaries of the regions 104, 106 and any prelabeled artwork. A user may interact with the labeling application 270 to provide and position label information 280 such as text, graphics, and images to be marked in the labelable regions 106 of the disc 100.

After the user has provided the label information 280, a label data generator module 282 converts the label information 280 to label data 252, which is in a form that can be efficiently received by the disc drive 200 and labeled onto the disc 100. The label data generator 282 also corrects for the phenomenon that artwork in the unlabelable areas 104, or encoded data 122a-b, may be prelabeled at different angular positions on different discs 100. That is, the prelabeled artwork or encoded data may be rotated at a first angular offset from the index mark 118 on one disc 100, but at a second angular offset on another disc 100. The template displayed for the user does not illustrate this rotation, but rather illustrates the template on the display at a normal or desired rotation. Therefore, the label data generator module 282 rotates the label data 252 as needed in order to ensure that the labeled disc 100 appears as the user intended. This is particularly useful for certain artwork that is directional in nature, such as an outdoor scene showing mountains against a horizon that has a natural top and bottom to it, or artwork such as a prelabeled form with labelable regions to which user information is added.

In some embodiments, the host 270 includes an operation validator module 286 that validates a requested operation 288 from the user based on the unlabelable regions 104 on a disc 100 in the disk drive 200. Each entry in the library 276 may be further associated with a list of permitted operations, as will be discussed subsequently with reference to FIG. 7. When the requested operation 288 is received from the user, it is compared against the permitted operations that are associated with the identified artwork. The requested operation 288 is performed only if it is a permitted operation. If there are no permitted operations associated with a particular entry in the library 276, then in one embodiment all requested operations 288 will be allowed, while in another embodiment all requested operations 288 will be prohibited. In one example requested operation, the user may request that the binary data for a collection of music on the host 260 be written to a disc 100 inserted in the drive 200. However, if the host 260 is part of a digital music store that pays royalties for each song burned to disc, it would be advantageous for the store to ensure that the songs can be burned only on a disc 100 containing special prelabeled artwork that must be purchased from the store. In another scenario, where a company may issue a disc containing unique prelabeled artwork to every employee, the disc 100 may serve as a key or an "identification card" to enable and track a user's access to the host 260.

Where embodied in the form of software or firmware, the various modules in memory 206, 264 may be implemented using any one of a number of programming languages such as, for example, C, C++, Assembly, or other programming languages. The modules may be implemented, for example, in an object oriented design or in some other programming architecture. Where any portion of the modules is represented in a flow chart herein, assuming that the functionality depicted is implemented in an object oriented design, for example, then each block of such flow charts may represent functionality that is implemented in one or more methods that are encapsulated in one or more objects.

The memory 206,264 may comprise, for example, random access memory (RAM), such as, for example, static random access memory (SRAM), dynamic random access memory (DRAM), or magnetic random access memory (MRAM) and other such devices. In addition, the memory 206,264 may also include, for example, read-only memory (ROM) such as a programmable read-only memory (PROM), an erasable programmable read-only memory (EPROM), an electrically erasable programmable read-only memory (EEPROM), or other like memory device.

In addition, the processor 204,262 may represent multiple processors and the memory 206,264 may represent multiple memories that operate in parallel. In such a case, the local interface 208,266 may be an appropriate network that facilitates communication between any two of the multiple processors, between any processor and any one of the memories, or between any two of the memories, etc. The processor 204,262 may be of electrical, optical, or molecular construction, or of some other construction as can be appreciated by those with ordinary skill in the art.

Figure 3:
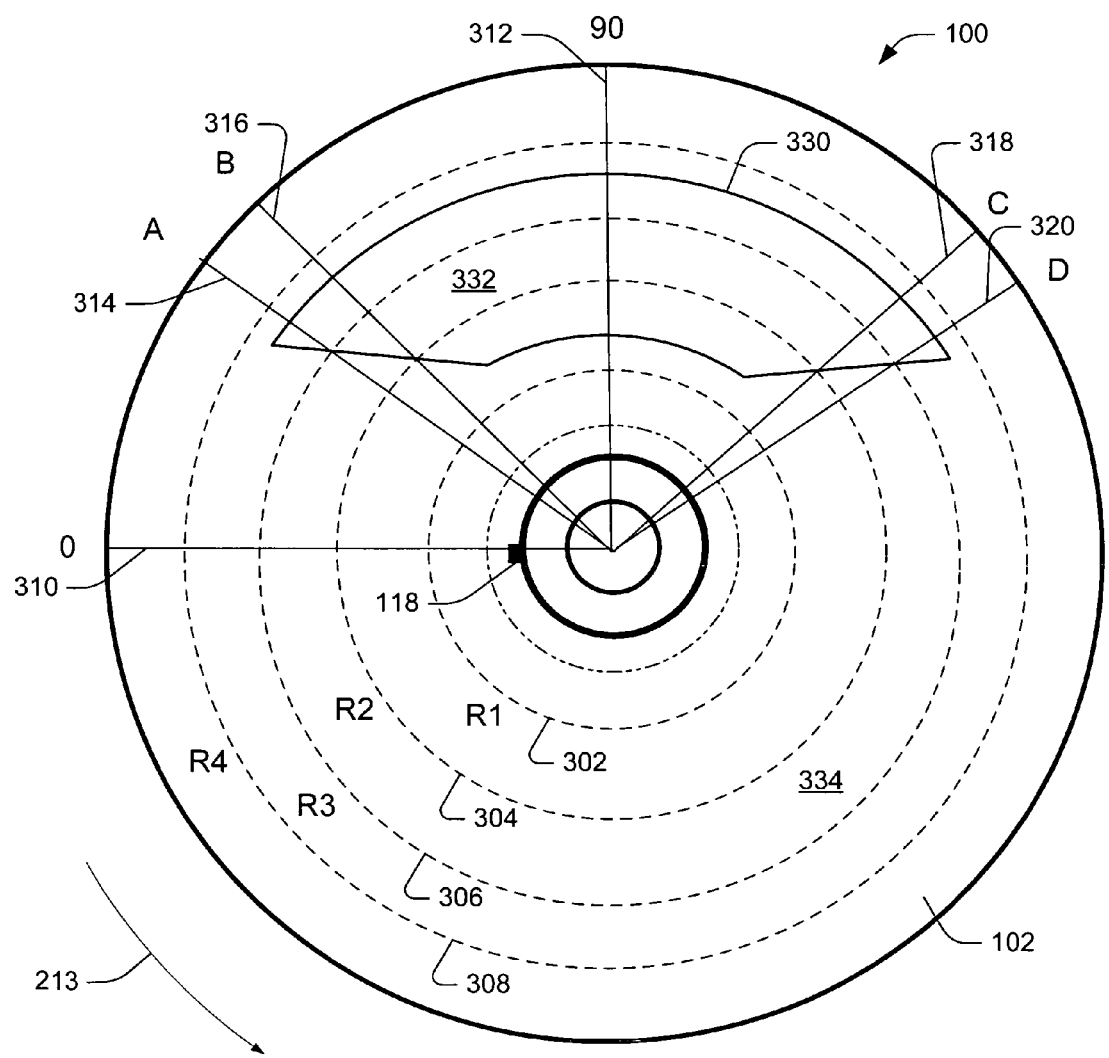
FIG. 3 is a schematic representation of the exemplary optical storage medium of FIG. 1 illustrating radial and angular positions usable for identifying the labelable and unlabelable regions, in accordance with an embodiment of the present invention.

Considering now, with reference to FIG. 3, one embodiment of the identification of labelable and unlabelable regions, and the characterization of prelabeled artwork, for an exemplary optical disc 100, a beam of energy from a laser 220 is impinged on surface 102 and the reflected laser energy 226 detected via sensor 222. The laser beam 224 may be impinged along one or more radii of the disc 100 as the disc 100 is rotated in direction 213 by the spindle 214. FIG. 3 illustrates four exemplary radii, R1 302, R2 304, R3 306, and R4 308. Other embodiments may impinge the laser along other numbers of radii. Using more radii may improve the accuracy of region detection and artwork identification, while using fewer radii may reduce the time required to identify regions and characterize artwork. FIG. 3 also illustrates several exemplary angular positions. Angular position 310 corresponds to an angular displacement of 0 degrees from index mark 118, while angular position 312 corresponds to an angular displacement of 90 degrees from index mark 118. Angular positions B 316 and C 318 correspond to the angular positions for radius R2 304 where there is a transition between a labelable region and an unlabelable region. Angular positions A 314 and D 320 correspond to the angular positions for radius R3 306 where there is a transition between a labelable region and an unlabelable region. Neither radius R1 302 nor radius R4 308 encounters any transitions between a labelable region to an unlabelable region. A boundary 330 distinguishes a first region 332 within the boundary 330 from a second region 334 outside the boundary 330.

In one embodiment, the transitions between a labelable region and an unlabelable region may be detected because of the differences in the materials used to form these regions. As discussed heretofore, the laser-imageable material of the labelable region is highly absorptive of the laser energy of the particular wavelength used to mark the laser-imageable material, and thus the sensor 222 will generate a relatively low reflected energy signal when the laser-imageable material is irradiated with laser energy of the particular wavelength. Similarly, if a significantly higher reflected energy signal is detected, it can be established that non-laser-imageable material was irradiated.

Figure 4A:
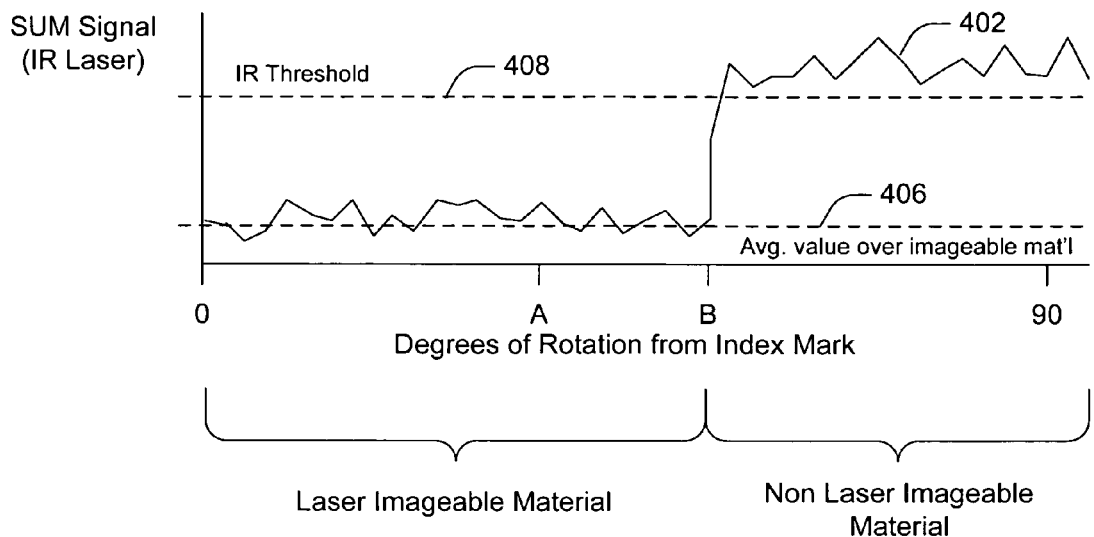
FIG. 4A is an exemplary waveform diagram illustrating the reflected infrared energy signal detected by the optical media system of FIG. 2 for the medium of FIG. 1 at one of the radial positions and several of the angular positions of FIG. 3, in accordance with an embodiment of the present invention.

For example, and with reference to FIG. 4A, the particular wavelength that can change the optical properties of the laser-imageable material in labelable region 106 may correspond to the wavelength of an infrared (IR) laser. FIG. 4A illustrates a portion of an exemplary sum signal detected by sensor 222, a waveform 402 depicting the reflected laser energy from a beam of infrared laser energy. This exemplary waveform 402 corresponds to the laser 220 being positioned at radius R2 304 of disc 100, and illustrates the sum signal for a portion of the angular positions corresponding from 0 degrees to about 90 degrees rotation from the index mark 118. Waveform 402 further corresponds to the region 332 that represents an unlabelable region 104, and the region 334 that represents a labelable region 106, as illustrated in FIG. 1. In the portion of waveform 402 that corresponds to the laser-imageable material (i.e. between 0 and B degrees), the sum signal waveform 402 is at a relatively low level that corresponds to an average value 406 of the sum signal over laser imageable material and that indicates that the surface of disc 100 is highly absorptive of the infrared laser energy in this region. For the portion of the angular positions that correspond to non-laser-imageable material (i.e. between B degrees and 90 degrees), the sum signal waveform 402 is at a relatively higher level that is above an IR threshold 408.

In some situations, however, irradiation of non-laser-imageable material may not generate a sum signal that is above the IR threshold 408. This may occur, for example, where the non-laser-imageable material is of a particular color and/or darkness that does not highly reflect IR energy; for example, a dark red color. In such situations, irradiating the material with laser energy of at least one additional wavelength different from the particular wavelength can distinguish non-labelable regions from labelable regions. While the laser-imageable material has the characteristic of being highly absorptive of laser energy of a particular wavelength but highly reflective of all other wavelengths, it is unlikely that colored or dark non-laser-imageable materials would have the same characteristic.

Figure 4B:
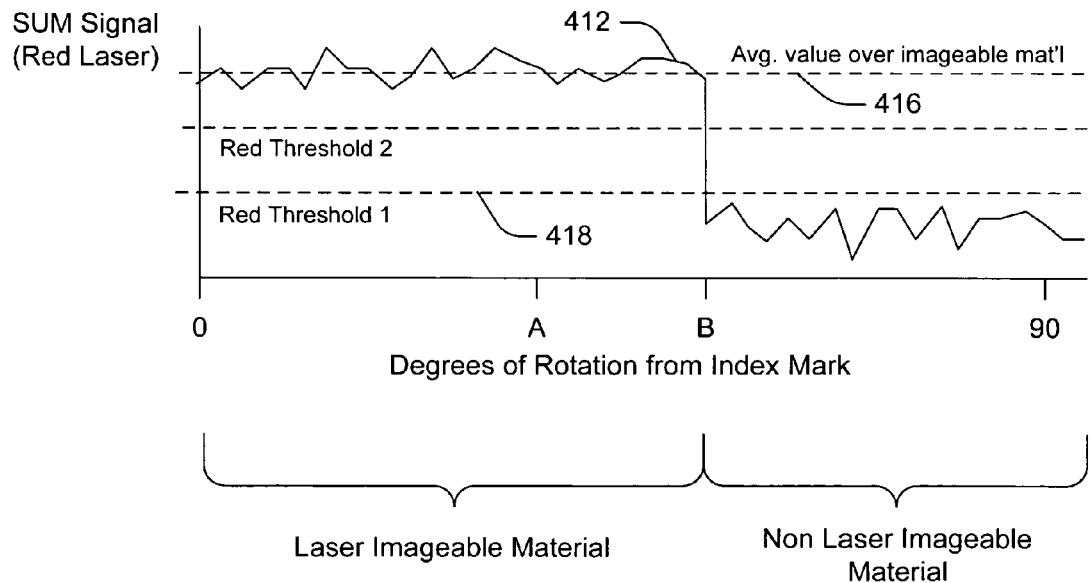
FIG. 4B is an exemplary waveform diagram illustrating the reflected red energy signal detected by the optical media system of FIG. 2 for the medium of FIG. 1 at one of the radial positions and several of the angular positions of FIG. 3, in accordance with an embodiment of the present invention.

For example, and with reference to FIG. 4B, one different wavelength may correspond to the wavelength of the energy emitted from a red laser. FIG. 4B illustrates a portion of an exemplary sum signal detected by sensor 222, more particularly a waveform 412 depicting the reflected laser energy from a beam of red laser energy. This exemplary waveform 412 corresponds to the laser 220 being positioned at radius R2 304 of disc 100, and illustrates the sum signal for a portion of the angular positions corresponding from 0 degrees to about 90 degrees rotation from the index mark 118. Waveform 412 further corresponds to the region 332 that represents an unlabelable region 104, and the region 334 that represents a labelable region 106, as illustrated in FIG. 1. In the portion of waveform 412 that corresponds to the laser-imageable material (i.e. between 0 and B degrees), the sum signal waveform 412 is at a relatively high level that corresponds to an average value 416 of the sum signal over laser imageable material, and that indicates that the surface of disc 100 is highly reflective of the red laser energy in this region. For the portion of the angular positions that correspond to non-laser-imageable material (i.e. between B degrees and 90 degrees), the sum signal waveform 412 is at a relatively lower level that is below a red threshold 1 418, as might occur where the non-laser-imageable material has a dark red color. Therefore, the non-laser-imageable material can be identified as existing at angular positions where the sum signal waveform 412 is below the red threshold 1 418.

However, in some situations laser energy of yet another different wavelength may additionally be used to distinguish non-laser-imageable material from imageable material. For example, non-laser-imageable material having a medium red color may not absorb enough energy from the red laser to generate a sum signal that is below the red threshold 1 418. Therefore, and with reference to FIG. 5, two wavelengths of laser energy different from the particular wavelength may be used to distinguish the material. In one embodiment, these wavelengths may correspond to the laser energy generated by a red laser and a blue laser. In this situation, the sum signal waveform 502 corresponding to the reflected red laser energy from the medium red non-laser-imageable material (i.e. B degrees to 90 degrees) is higher than the red threshold 1 418, but lower than a more relaxed red threshold 2 504. In addition, the sum signal waveform 512 corresponding to the reflected blue laser energy from the medium-red non-laser-imageable material is lower than a blue threshold 514. The blue threshold 514 may be established with regard to an average value 516 of the sum signal over the laser imageable material (i.e. 0 degrees to B degrees). The medium-red non-laser imageable material, while somewhat reflective of the blue laser energy, is not as highly reflective of the blue laser energy as is the laser-imageable material.

Expressed mathematically, locations at a particular radial and angular position on the disc 100 will be identified as non-laser-imageable material if the following Boolean equation evaluates as true:

(IR sum>IR threshold) OR (Red sum<Red threshold 1)) OR ((Red sum<Red threshold 2) AND (Blue sum<Blue threshold))

A combination CD/DVD disc drive typically includes a laser or lasers for emitting both IR and red laser beams. In one embodiment, the IR laser beam has a wavelength of approximately 780 nm, while the red laser beam has a wavelength of approximately 650 nm. In such a drive, only the first two terms of the Boolean equation can be evaluated in order to determine whether a location is labelable or non-labelable. A Blu-ray disc drive or an HD-DVD drive typically include a laser or lasers for emitting IR, red, and blue laser beams. In one embodiment, the blue laser beam has a wavelength of approximately 405 nm. In such a drive, all three terms of the Boolean equation can be evaluated in order to determine whether a location is labelable or non-labelable. In one embodiment, the disc surface is scanned first with the IR laser, then with the red laser, and then (if present) with the blue laser. In another embodiment, locations on the surface identified as non-laser imageable by the IR laser do not have to be subsequently scanned with the red or blue lasers, and locations identified as non-laser-imageable by the IR and red lasers in combination do not have to be subsequently scanned with the blue laser, thus reducing the time required to determine the labelable and unlabelable regions.

In one embodiment, the IR threshold 406 corresponds to a level that is 10% higher than the average value of the reflected IR laser energy for the laser-imageable material, the red threshold 1 418 corresponds to a level that is 10% lower than an average value of the reflected red laser energy for the laser-imageable material, the red threshold 2 504 corresponds to a level that is 5% lower than an average value of the reflected red laser energy for the laser-imageable material, and the blue threshold 514 corresponds to a level that is 5% lower than an average value of the reflected blue laser energy for the laser-imageable material. These average values may be determined during operation for each individual disc 100, or may be determined in advance based on a representative disc 100 or the aggregate of a number of discs 100.

Once the non-laser-imageable locations on the disc have been identified, in one embodiment the remaining locations may all be considered as laser-imageable locations. In another embodiment, a positive identification of laser-imageable material may be ascertained where the following Boolean equation evaluates as true:

(IR sum<IR threshold) AND (Red sum>Red threshold 1)) AND ((Red sum>Red threshold 2) OR (Blue sum>Blue threshold))

In other words, the remaining locations may be scanned to determine whether, or confirm that, they constitute laser-imageable material.

Figure 5:
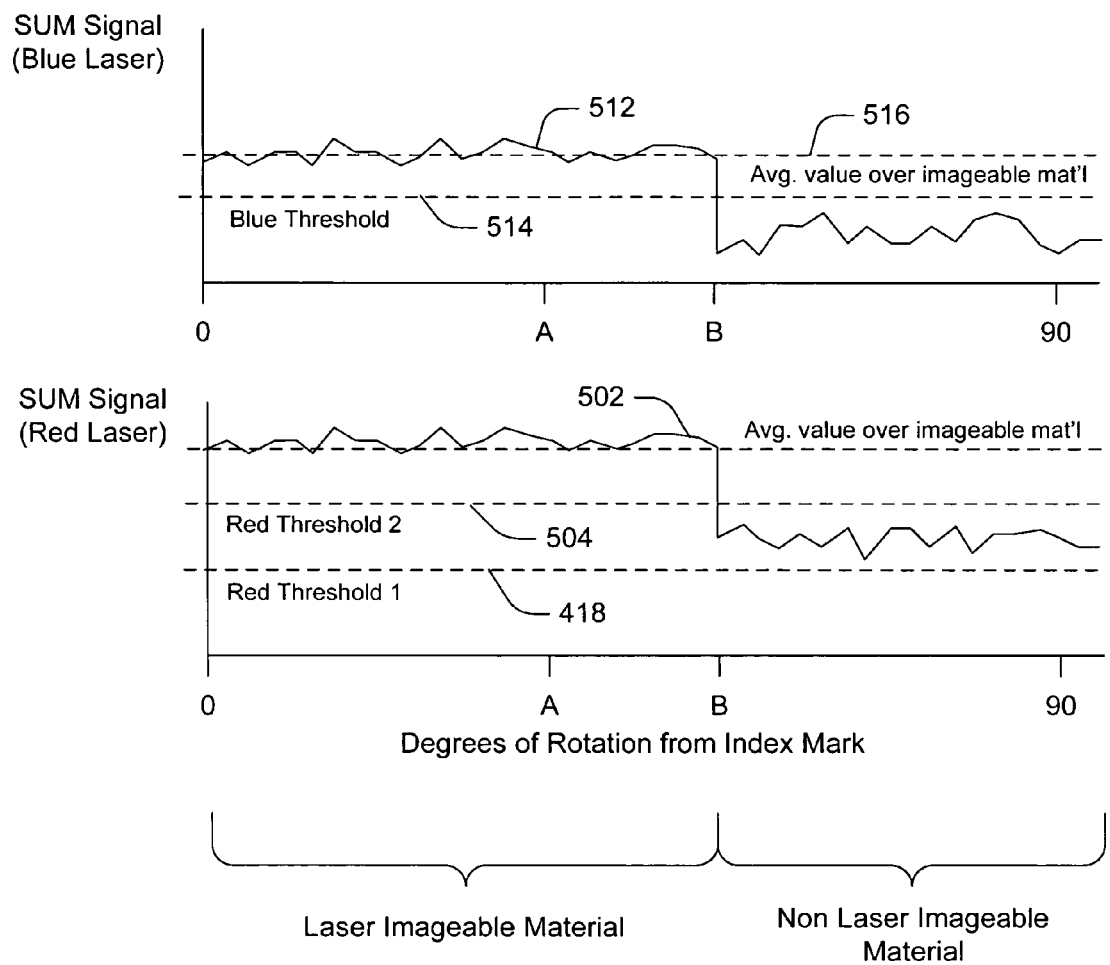
FIG. 5 is another exemplary waveform diagram illustrating the reflected blue, red, and infrared energy signals detected by the optical media system of FIG. 2 for the medium of FIG. 1 at one of the radial positions and several of the angular positions of FIG. 3, in accordance with an embodiment of the present invention.

While FIGS. 4A-B and 5 describe laser-imageable material that absorbs and is markable by IR laser energy, in other embodiments the laser-imageable material may absorb and be markable by laser energies of different wavelengths. For example, one type of material may be markable by red laser energy, and another type of material by blue laser energy. In addition, the color resulting when different types of materials are marked may also be different. A disc 100 may include multiple types of laser-imageable materials markable by different laser energy wavelengths and resulting in different colors when marked. The techniques described above for determining non-laser-imageable and laser-imageable locations may be modified in an analogous manner to detect and locate labelable regions having various different types of laser-imageable materials.

In another embodiment, the texture of the disc surface, particularly in the unlabelable regions, may also be detected by the sensor 222. For example, the variations in the height or the number of the different silk-screened layers may form edges that exhibit a different reflectivity than flat areas of the disc surface. The pattern of such edges may allow the texture to be determined. The texture provides an additional or alternative way to determine the position of the labelable and unlabelable regions on the disc.

Considering now in greater detail the identification of prelabeled artwork on the disc 100, and with reference to FIGS. 2 and 6A-D, one or more artwork parameters 242 are determined by the disc drive 200 and provided to the host 260 which then identifies the artwork and obtains a corresponding artwork template. In one embodiment as understood with reference to FIG. 6A, the artwork parameter 242 is the decoded artwork identifier 602 produced by decoder module 244 from the encoded data 122a-b.

In other embodiments, the artwork parameters 242 may be a fingerprint generated by the fingerprinter module 246. In one embodiment as understood with reference to the exemplary embodiment of FIG. 6B, the fingerprint includes a set 604 of average values of the sum signals at one or more radii of the disc 100. While average sum signals for four radii are illustrated, this is merely exemplary and more or fewer radii may be used. In one embodiment, the average sum signal for each radius encompasses an entire 360 degree span of the disc 100, and the fingerprint can be constructed without first determining whether, or where, any labelable regions or unlabelable regions are located. In one embodiment, the artwork parameters 242 include a set 604 of average sum signals for each of a plurality of different laser energy wavelengths; for example, IR, red, and blue.

In another embodiment as understood with reference to the exemplary embodiment of FIG. 6C, the fingerprint includes a set 606 of average values of the sum signals at one or more radii of the disc 100, where each average value of a sum signal represents the value over an angular distance that corresponds to a region of the disc 100 that contains artwork. In other words, each average value excludes data points where the sum signal corresponds to the laser-imageable material. In addition, the set 606 includes the starting and ending angular positions (labeled as "Angle 1" and "Angle 2") corresponding to each average sum signal value. For example, at radius R3 306, SUM 3' is the average sum signal measured from angular position A to angular position D, while at radius R2 304, SUM 2' is the average sum signal measured from angular position B to angular position C. Since more than one artwork region may be located at a particular radius, the number of artwork regions at each radius may be specified, and the set 606 include corresponding Angle 1, Angle 2, and the average sum signal values for each artwork region for the radius. In one embodiment, the artwork parameters 242 may include a set 606 of average sum signals for each of a plurality of different laser energy wavelengths; for example, IR, red, and blue. In an alternate embodiment, the average sum signal values may be omitted from set 606, such that for each artwork region at a particular radius only Angle 1 and Angle 2 are specified.

In another embodiment as understood with reference to the exemplary embodiment of FIG. 6D, the fingerprint includes a collection 608 of sum signal waveforms at one or more radii of the disc 100. In one embodiment, each waveform includes data points only for the angular positions that correspond to a region of the disc 100 that contains artwork; in other words, the waveform excludes data points where the sum signal waveform corresponds to the laser-imageable material. For example, the illustrated waveform SUM3" 610, for radius R3 306 includes data points from angular position A through D degrees, while waveform SUM2" 612, for radius R2 304 includes data points from angular position B through C degrees. In another embodiment, each waveform includes data points for all 360 degrees of angular positions on the disc 100; in this embodiment, the fingerprint can be constructed without first determining whether, or where, any labelable regions or unlabelable regions are located. In an alternate embodiment the sum signal waveforms may be converted into binary values based on the thresholds; for example, waveform SUM2" 612 may have a value of 1 between angular position B through C degrees and a value of 0 elsewhere, and waveform SUM3" 610 may have a value of 1 between angular position A through D degree and a value of 0 elsewhere.

Considering now in greater detail the identification of artwork in the unlabelable region or regions 104, and with reference to FIGS. 2 and 7, the artwork identifier 272 of host 260 uses the artwork parameters 242 received from disc drive 200 and discussed in detail heretofore to identify the artwork in the unlabelable region 104. The comparator 274 compares the fingerprint or ID provided in the artwork parameters 242 to the contents of prelabeled artwork library 276. In one embodiment, library 276 may be loaded from a file or a database by labeling application 270. Library 276 includes at least one individual entry 702. Each entry 702 includes a predefined fingerprint or predefined identifier 704 that the comparator 274 compares to the fingerprint or ID provided in the artwork parameters 242. If the comparator 274 finds a match, then the template 706 for the matching entry 702 will be displayed by the template display module 278 to the user, so that the user can see a representation of the artwork on the disk and the labelable region or regions, and so that the user can enter label information 280 for marking onto the labelable region or regions by the optical disc drive 200.

For fingerprints that include angular position information, such as angular positions A, B, C, D of fingerprints 606, 608, the comparator 274 may take into account the phenomenon, discussed heretofore, that the artwork may be prelabeled at different angular positions on different discs 100. In one embodiment, the angular positions A, B, C, D may be treated for purposes of comparison with entries 702 in the library 276 not as absolute angular positions, but rather as positions relative to each other. For example, the angular span of the prelabeled artwork at a specific radial position, such as C-B or D-A, may be compared to the corresponding parameters in the library entries 702. Or, the angular difference in positions between two radii, such as B-A or C-D, may be compared to the corresponding parameters in the library entries 702.

In some embodiments, a template 706 may also include region information 708 that defines the boundaries of the unlabelable region(s) and the labelable region(s) on the disc 100. This may be especially useful where these regions are not identified by the optical drive 200.

In some embodiments, some of the entries 702 may further include a set of permitted operations 710 that are associated with the predefined fingerprint or predefined identifier 704. As has been discussed heretofore with reference to FIG. 2, the operation validator module 286 of the host 260 may compare a requested operation 288 received from the user against the set of permitted operations 710 to determine whether the requested operation 288 is listed as a permitted operation for the disc 100 that is presently installed in the optical drive 200, and then take action on the requested operation 288 accordingly.

Figure 8:
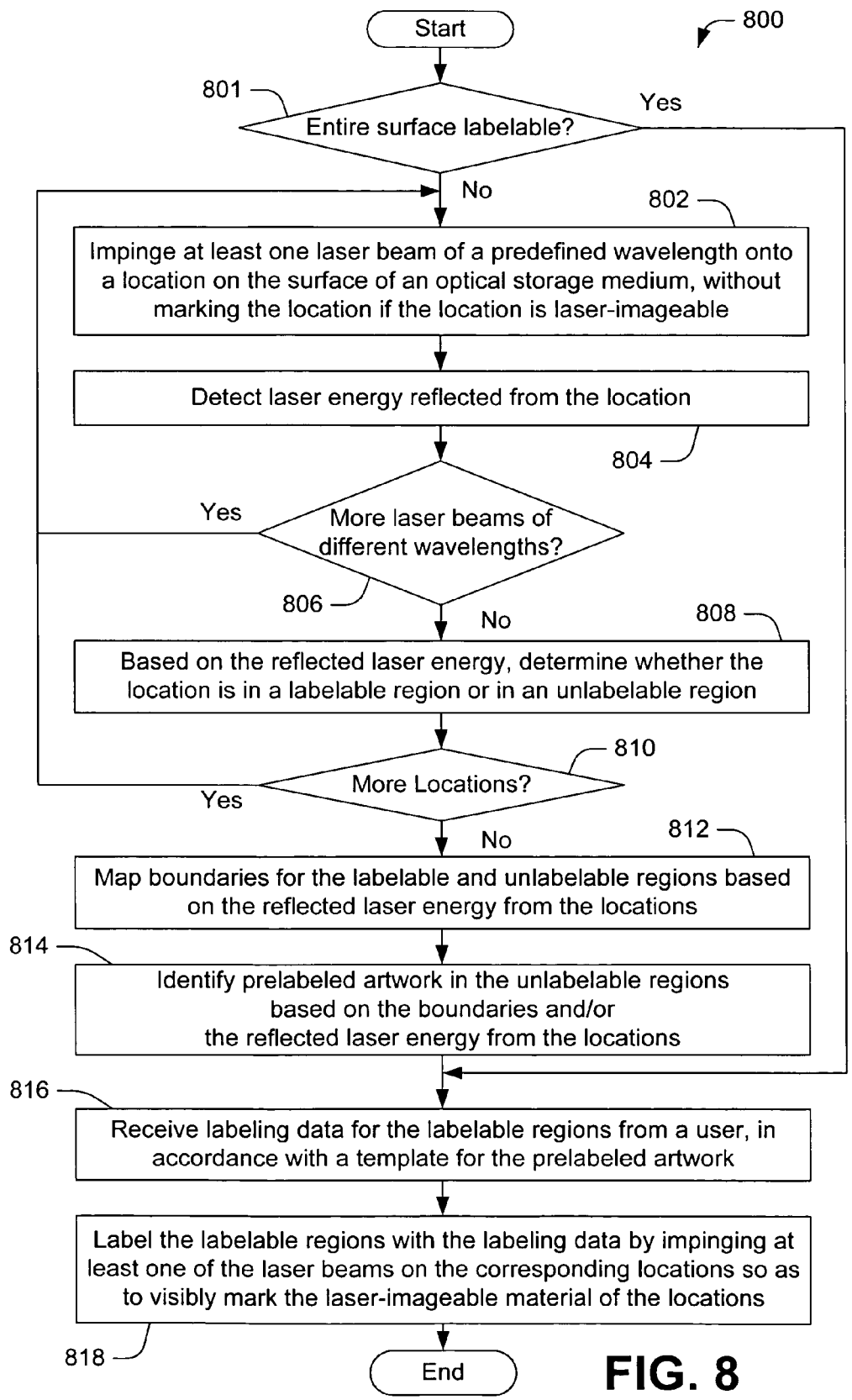
FIG. 8 is a flowchart in accordance with an embodiment of the present invention of a method of labeling an optical medium.

Another embodiment of the present invention, as best understood with reference to FIG. 8, is a method 800 for labeling an optical medium. At 801, in some embodiments, it is determined whether the entire surface of an optical storage medium is known to be labelable; that is, if it is known that the surface does not contain any unlabelable regions. In one embodiment, this knowledge can be obtained from data that is encoded on the medium. If the entire surface is labelable ("Yes" branch of 801), then the method continues at 816. If it is not known whether or not the entire surface of the medium is labelable ("No" branch of 801), then the method continues at 802.

At 802, at least one laser beam of a predefined wavelength is impinged from a laser onto a location on the surface of an optical storage medium, without marking the location if the location is laser-imageable by exposure to laser energy of the predefined wavelength. At 804, laser energy reflected from the location on the surface of the optical storage medium is detected. If a laser beam of a different wavelength is to also be used ("Yes" branch of 806), then the method continues at 802. Otherwise ("No" branch of 806), in some embodiments, it is determined at 808 whether the location is in a labelable region having laser-imageable material that is markable by impinging the laser beam of at least one of the wavelengths on the material at a predetermined intensity and for a predetermined period of time, or whether the location is in an unlabelable region that is not markable by any of the laser beams. If more locations on the surface of the optical storage medium are to be examined ("Yes" branch of 810), then the method continues at 802. Where the optical medium is an optical disc drive, the additional locations may be different angular positions at the same radial position so as to cover all 360 degrees, or the additional locations may be different radial positions so as to cover the full laser-accessible radius of the disc. To minimize the scan time, a minimum feature size for a labelable area may be defined and used as the increment for adjacent locations in the radial position, the angular position, or both. In one embodiment, the minimum feature size may be 3 millimeters. In some embodiments, there may be an interest in resolving region boundaries with higher resolution than the minimum feature size. In such situations, an adaptive approach can be undertaken in which a rescan is performed using a smaller minimum feature size only in the neighborhood of the region boundaries so as to more accurately determine the radial and angular position of the boundaries but to minimize the additional scan time required. Such an adaptive approach may also be used to identify boundaries that occur where two labelable regions, each markable by laser energy of the same wavelength but having a different background color, abut one another. Despite the difference in background color, the sum signal response to laser energy of the two regions may be similar enough to make distinguishing the regions difficult, thus scanning at a higher resolution may allow the region boundaries to be identified more accurately.

If no more locations on the surface of the optical storage medium are to be examined ("No" branch of 810), then, in some embodiments, boundaries for the labelable and unlabelable regions are mapped based on the laser energy reflected from the locations. At 814, prelabeled artwork, if any, in the unlabelable regions is identified based on the boundaries, on the reflected laser energy from the locations, or both. At 816, labeling data for the labelable regions is received from a user, in accordance with a template associated with the prelabeled artwork that has been displayed to the user. In some embodiments, the boundaries for the labelable and/or unlabelable regions are determined based on the predefined artwork, the template, or both. At 818, the labelable regions are labeled with the labeling data by impinging at least one of the laser beams on the corresponding locations of the surface of the optical disc at a sufficient intensity and for a sufficient duration so as to visibly mark the laser-imageable material of those locations. Following this, the method 800 concludes.

In an alternate method embodiment, decision elements 806 and 810 can be interchanged such that, instead of impinging a particular location with multiple laser beams of different wavelengths before impinging the next location, all locations may be impinged with a laser beam of a particular wavelength before switching to a laser beam of a different wavelength.

In another alternate method embodiment, elements 808 and 812 may be absent, with the boundaries for the labelable and unlabelable regions being determined at 814 based on the predefined artwork, the template, or both.

Figure 9:
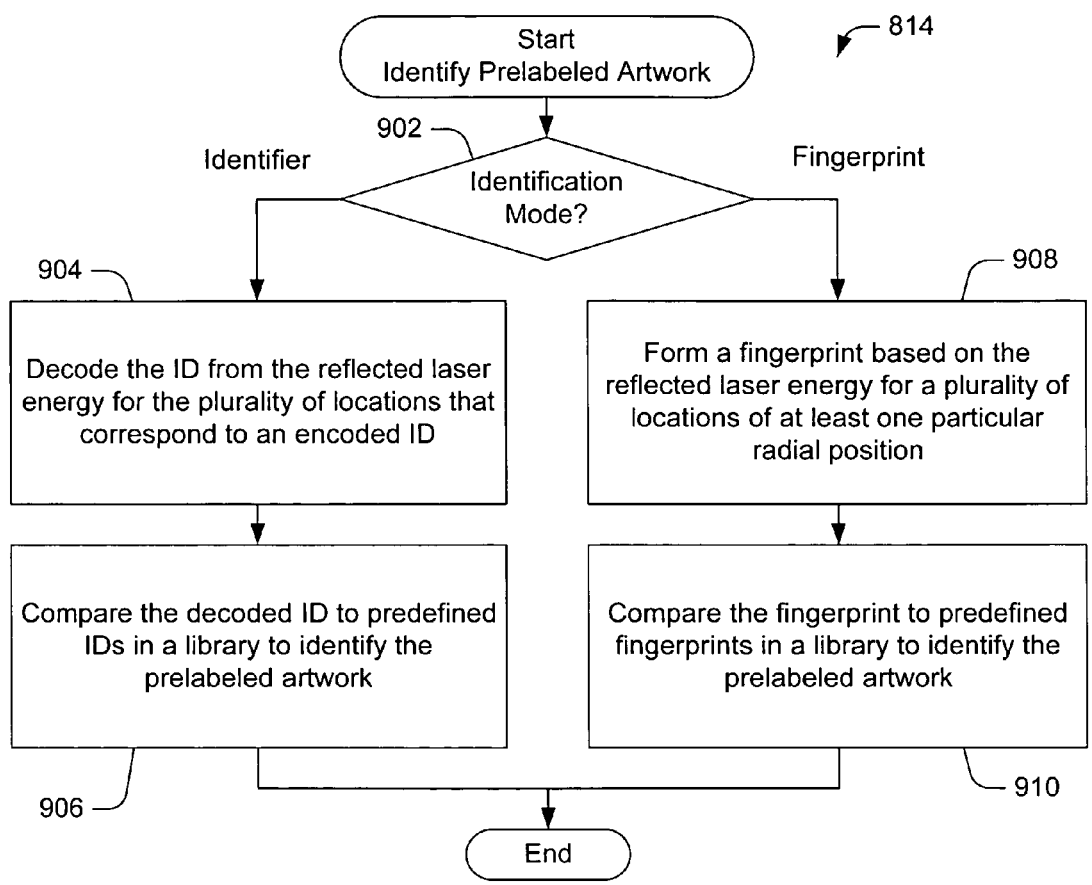
FIG. 9 is a lower-level flowchart in accordance with an embodiment of the present invention of a method of identifying prelabeled artwork.

Considering now in greater detail one embodiment of the identification of prelabeled artwork 814, and with reference to FIG. 9, as part of the identification 814 an identification mode is determined at 902. If the identification mode is an identifier, then at 904 the identifier is decoded from the reflected laser energy for the plurality of locations on the surface of the optical medium that correspond to an encoded identifier. In one embodiment, the encoded identifier may be the encoded data 122*a-b* (FIG. 1) on an optical disc. Then, at 906, the decoded identifier is compared to predefined identifiers in a library to identify the prelabeled artwork, and the identification 814 concludes.

If the identification mode at 902 is a fingerprint, then at 908 the fingerprint is formed based on the reflected laser energy for a plurality of locations of at least one particular radial position. At 910, the fingerprint is compared to predefined fingerprints in a library to identify the prelabeled artwork, and the identification 814 concludes. In some embodiments, in order to account for the situation where the prelabeled artwork 104 may be located on the disc 100 at a slightly different angular or radial position than the position indicated in the library, a comparison based on the relative position of the identified locations to each other may be performed.

From the foregoing it will be appreciated that the systems, apparatuses, and methods provided by the present invention represent a significant advance in the art. Although several specific embodiments of the invention have been described and illustrated, the invention is not limited to the specific methods, forms, or arrangements of parts so described and illustrated. For example, the invention is not limited to optical disc drives and disc media, but rather may be used with devices for labeling other types of media having regions of laser-imageable material. Such media may include rigid or flexible substrates having regions fabricated of, or coated with, laser-imageable material. The devices for labeling this media may include one or more sources of laser energy that can be positioned relative to the media by other than rotational means, such as by a two or three dimensional rectilinear positioning system. This description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Unless otherwise specified, steps of a method claim need not be performed in the order specified. The invention is not limited to the above-described implementations, but instead is defined by the appended claims in light of their full scope of equivalents. Where the claims recite "a" or "a first" element of the equivalent thereof, such claims should be understood to include incorporation of one or more such elements, neither requiring nor excluding two or more such elements.

What is claimed is:

1. A method of locating a labelable region on a surface of an optical storage medium including an unlabelable region, comprising:
   impinging at least two laser beams each having a different wavelength onto a location on the surface without marking the location;
   detecting laser energy of the at least two different wavelengths reflected from the location; and
   based on the reflected laser energy of the at least two different wavelengths, determining whether the location is in a labelable region markable by the laser energy of a predetermined wavelength or an unlabelable region not markable by the laser energy of the predetermined wavelength.

2. The method of claim 1, comprising:
   repeating the impinging and the detecting for a plurality of locations of the surface; and based on the reflected laser energy for the plurality of locations, mapping boundaries for at least one of the labelable region or the unlabelable region.

3. The method of claim 2, wherein the optical storage medium is an optical disc, wherein an individual one of the locations has a radial and an angular dimension, and wherein the repeating is performed at intervals of the radial and the angular dimension.

4. The method of claim 3, wherein the dimensions of locations in the neighborhood of the boundaries are smaller than the dimensions of locations elsewhere.

5. The method of claim 1, wherein the labelable region comprises laser-imageable material relatively absorptive of laser energy of a predetermined wavelength hut relatively reflective of laser energy of other than the predetermined wavelength, the material capable of undergoing an optically visible change to form a mark upon application of a sufficient intensity of the laser energy of the predetemined wavelength for a sufficient period of time, and wherein the unlabelable region comprises non-laser-imageable material that cannot be marked by the laser energy.

6. The method of claim 5, wherein the unlabelable region comprises at least one topmost silkscreened or printed layer incapable of being marked by the laser energy, the unlabelable region having a color which is relatively reflective of laser energy of the predetermined wavelength or relatively absorptive of laser energy of at least one frequency other than the predetermined wavelength.

7. The method of claim 5, wherein the unlabelable region comprises at least one topmost silkscreened or printed layer incapable of being marked by the laser energy, the unlabelable region having a different surface texture than the labelable region due at least in part to the at least one layer.

8. The method of claim 1, wherein the labelable region comprises a plurality of labelable regions, and wherein the predetermined wavelength is different for at least two of the labelable regions.

9. The method of claim 1, wherein the labelable region comprises a plurality of labelable regions, and wherein at least two of the labelable regions have a different background color.

10. The method of claim 1, wherein the predetermined wavelength is one of the at least two different wavelengths.

11. The method of claim 1, wherein the predetermined wavelength is not one of the at least two different wavelengths.

12. A method of locating a labelable region on a surface of an optical storage medium including an unlabelable region, comprising:

impinging onto a location on the surface, without marking the location, a first laser beam having a predetermined wavelength and a second laser beam having a second different wavelength, detecting laser energy reflected from the location having the predetermined wavelength and the second different wavelength, and based on the reflected laser energy, determining whether the location is in a labelable region markable by the laser energy or an unlabelable region not markable by the laser energy, wherein the location is in the unlabelable region if the detected laser energy of the predetermined wavelength is greater than a first threshold or the detected laser energy of the second different wavelength is less than a second threshold.

13. The method of claim 12, wherein the first threshold is about 10% more than art average value of the reflected laser energy of the predetermined wavelength for the labelable region, and wherein the second threshold is about 10% less than an average value of the reflected laser energy of the second different wavelength for the labelable region.

14. The method of claim 12, wherein the impinging comprises impinging a third laser beam having a third different wavelength wherein the detecting comprises detecting the reflected laser energy having the third different wavelength, and wherein the determining comprises determining that the location is in the unlabelable region if the detected laser energy of the second different wavelength is less than a third threshold and the detected laser energy of the third different wavelength is less than a fourth threshold.

15. The method of claim 14, wherein the third threshold is about 5% less than an average value of the reflected laser energy of the second different wavelength for the labelable region, and wherein the fourth threshold is about 5% less than an average value of the reflected laser energy of the third different wavelength for the labelable region.

* * * * *

UNITED STATES PATENT AND TRADEMARK OFFICE
CERTIFICATE OF CORRECTION

PATENT NO. : 7,492,385 B2 Page 1 of 1
APPLICATION NO. : 11/357762
DATED : February 17, 2009
INVENTOR(S) : David M Kwasny et al.

It is certified that error appears in the above-identified patent and that said Letters Patent is hereby corrected as shown below:

In column 17, line 14, in Claim 5, delete "hut" and insert -- but --, therefor.

In column 17, line 18, in Claim 5, delete "predetemined" and insert -- predetermined --, therefor.

In column 18, line 21, in Claim 13, delete "art" and insert -- an --, therefor.

In column 18, line 29, in Claim 14, delete "wavelength" and insert -- wavelength, --, therefor.

Signed and Sealed this

Eighteenth Day of August, 2009

David J. Kappos
*Director of the United States Patent and Trademark Office*